United States Patent
Schwindt (10) Patent No.: US 8,020,307 B2
(45) Date of Patent: Sep. 20, 2011

(54) ALIGNMENT SYSTEM AND METHOD FOR VEHICLE-MOUNTED DEVICES

(75) Inventor: Oliver Frank Schwindt, Novi, MI (US)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 12/691,265

(22) Filed: Jan. 21, 2010

(65) Prior Publication Data

US 2010/0186244 A1   Jul. 29, 2010

Related U.S. Application Data

(60) Provisional application No. 61/147,156, filed on Jan. 26, 2009.

(51) Int. Cl.
*G01B 5/25* (2006.01)

(52) U.S. Cl. .............................. 33/288; 33/645

(58) Field of Classification Search ............... 33/286, 33/288, 613, 645
See application file for complete search history.

(56) References Cited

U.S. PATENT DOCUMENTS

| | | | |
|---|---|---|---|
| 2,314,559 A | | 3/1943 | Schilling |
| 2,552,116 A | | 5/1951 | Rodeghiero |
| 2,651,957 A | * | 9/1953 | Phillips .................. 81/3.36 |
| 4,303,338 A | * | 12/1981 | Morrison et al. ............ 356/155 |
| 4,338,027 A | * | 7/1982 | Eck .................. 356/155 |
| 4,454,659 A | | 6/1984 | Eck |
| 4,629,317 A | * | 12/1986 | January et al. ............ 356/155 |
| 4,726,122 A | * | 2/1988 | Andersson ............ 33/288 |
| 5,125,164 A | | 6/1992 | Fournier et al. |
| 5,313,711 A | * | 5/1994 | Kling et al. ............ 33/288 |
| 6,087,995 A | | 7/2000 | Grace et al. |
| 6,148,528 A | * | 11/2000 | Jackson ............ 33/288 |
| 6,329,952 B1 | | 12/2001 | Grace |
| 6,335,705 B1 | | 1/2002 | Grace et al. |
| 6,583,868 B2 | | 6/2003 | Hopfenmuller |
| 6,823,601 B2 | | 11/2004 | Murray |
| 7,382,913 B2 | | 6/2008 | Dorranc et al. |
| 2004/0083615 A1 | | 5/2004 | Cotner |
| 2008/0186383 A1 | | 8/2008 | Dorrance et al. |

FOREIGN PATENT DOCUMENTS

| | | |
|---|---|---|
| DE | 19900018 | 8/2000 |
| DE | 102004026044 | 12/2005 |
| EP | 0905526 | 3/1999 |
| EP | 1016873 | 7/2000 |

OTHER PUBLICATIONS

European Search Report for EP 10400003, dated Jun. 8, 2010, 7 pages.

* cited by examiner

*Primary Examiner* — G. Bradley Bennett
(74) *Attorney, Agent, or Firm* — Michael Best & Friedrich LLP (57) ABSTRACT

A system for aligning a device on a body of a vehicle relative to a drive axis of the vehicle defined by a pair of rear wheels. A bar is configured to be wedged against the pair of rear wheels to assume an orientation perpendicular to the vehicle drive axis. A target is configured to be positioned in the line of sight of the device to be oriented. Two substantially equal length elongated members are coupled between the bar and the target such that a parallelogram is created by the bar, the target, and the two elongated members, regardless of the position of the target relative to the vehicle and the bar. Multiple alignment methods are capable of being carried out with the alignment system.

23 Claims, 7 Drawing Sheets

ALIGNMENT SYSTEM AND METHOD FOR VEHICLE-MOUNTED DEVICES

CROSS-REFERENCE TO RELATED APPLICATIONS

This application claims priority to U.S. Provisional Patent Application No. 61/147,156, filed Jan. 26, 2009, the entire contents of which are hereby incorporated by reference.

BACKGROUND

The present invention relates to vehicle-mounted devices, and more particularly to systems and methods for aligning vehicle-mounted devices with the drive axis of the vehicle.

Various devices on a vehicle are designed to be aligned to the vehicle's drive axis (both pointing in the forward drive direction and the rearward drive direction) in order to obtain optimum performance. Such devices can include, but are not limited to, cameras, radar sensors, lidar sensors, and headlights. It is known that aligning such devices to the drive axis gives the optimal performance, but sometimes the alignment is done to the body axis, with the assumption that the drive axis is parallel to the body axis (although there can be a difference up to about 3.0 degrees). Previously, a large and expensive machine, sometimes referred to as a "rolls machine," present typically only at the vehicle assembly plant, was used to align these and other devices with the vehicle's drive axis. The machine lifts the vehicle on a set of powered rollers to allow the vehicle wheels to turn and to establish a natural drive path or drive axis while keeping the vehicle stationary. Once the drive axis has been determined, the devices are aligned to the drive axis at the assembly plant.

Another alignment system requires clamps to be mounted on the rear wheels, and the measuring of the angles formed between the clamps and a reference bar mounted on the ground. The average angle of the two rear wheels relative to the bar on the ground is used to set the angle of a mirror placed in front of the vehicle. The mirror is then used to align the vehicle-mounted devices (e.g., radar sensors). This system requires an expensive device for measuring and setting the angles of the mirror, expensive and cumbersome wheel clamps, and the mounting of a straight bar onto the ground without creating any torsion in the bar. While expensive and somewhat difficult to use, this system provides relatively accurate alignment, and is much more accurate than other less expensive prior art sensor alignment systems.

SUMMARY

The invention provides a system and method for aligning vehicle-mounted devices with the vehicle's drive axis that is less expensive, easier to use, and more portable than the alignment systems and methods described above.

In one construction, the invention provides a system for aligning a device on a body of a vehicle relative to a drive axis of the vehicle defined by a pair of rear wheels. A bar is configured to be wedged against the pair of rear wheels. A target is configured to be positioned in the line of sight of the device to be oriented. Two substantially equal length elongated members are coupled between the bar and the target such that a parallelogram is created by the bar, the target, and the two elongated members, regardless of the position of the target relative to the vehicle and the bar.

In another construction, the invention provides a method of orienting an alignment target relative to a vehicle for orienting a device on a body of a vehicle relative to a drive axis of the vehicle. A first end of a first elongated member of a predetermined length is coupled to a left side of the alignment target. A first end of a second elongated member of the predetermined length is coupled to a right side of the alignment target. The position of a second end of the first elongated member is fixed at a fixed distance from the axis of a rear axle of the vehicle. The position of a second end of the second elongated member is fixed at the fixed distance from the axis of the rear axle so that the second ends of the first and second elongated members are spaced apart a spacing distance that is measured parallel to the axis of the rear axle. The spacing distance is substantially equal to a distance between the first ends of the first and second elongated members, such that the alignment target is automatically oriented to be parallel to the axis of the rear axle and perpendicular to the vehicle drive axis.

In yet another construction, the invention provides a method of orienting a sensor on a body of a vehicle relative to a vehicle drive axis with a reflective alignment target. Respective first ends of two substantially equal length elongated members are coupled to the alignment target such that the first ends of the elongated members are spaced apart a spacing distance. Respective second ends of the elongated members are fixed at a fixed distance from the axis of a rear axle of the vehicle. The second ends of the elongated members are spaced apart a spacing distance substantially equal to the spacing distance between the first ends of the elongated members, such that the alignment target is automatically oriented to be parallel to the axis of the rear axle and perpendicular to the vehicle drive axis. A mirror of the alignment target is positioned in a vertical orientation. An amount of angular misalignment of the sensor relative to the drive axis is determined by operating the sensor to emit multiple signals and then measuring signals reflected off of the mirror with multiple antennas of the sensor.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

A vehicle 10 includes a body 14 and a plurality of wheels 22 and/or other means of contacting the ground to guide the vehicle 10 and define a drive axis $A_D$ (see FIG. 9) of the vehicle 10. The vehicle 10 illustrated in the figures is a conventional four-wheeled automobile provided with pneumatic tires mounted on metal rims and having a rear axle 24 defining an axis RA, the perpendicular bisector of which defines the vehicle's drive axis $A_D$. However, the invention can be used or adapted for use on other types of vehicles having at least one of a different arrangement of wheels and a different wheel or tire structure as well. As used herein, the term "wheel" refers to any type of structure or combination of structures (i.e., metal rim and tire) apparent to those of skill the art as suitable to provide a rolling support for a vehicle. In addition to automobiles, the invention is useful on any vehicle having one or more precision devices or components that depend on alignment with a drive axis for proper operation. Such alternative vehicles include, but are not limited to, motorcycles, recreational off-road vehicles such as ATV's and snowmobiles, aircraft, etc.

After the body 14 and the chassis (which carries the wheels 22) are joined together, an axis $A_B$ of the vehicle body 14 (see FIG. 9) is often offset from the drive axis $A_D$ of the vehicle 10 due to tolerance stack-up of vehicle components. Even a slight offset angle (e.g., 3 degrees) between the body axis $A_B$ and the drive axis $A_D$ can cause a loss of performance and/or operation of various sensors and/or devices 26 that are designed to be aligned with the drive axis $A_D$ for precision but are physically associated (coupled directly or indirectly) with the body 14. The body-mounted devices 26 may include, but are not limited to, cameras, radar sensors, lidar sensors, and headlights. A system and method are provided to align one or more of the body-mounted devices 26 with the drive axis $A_D$. Vertical alignment can also be carried out to orient the device 26 substantially parallel with the ground, ensuring that the device 26 is not pointed excessively upwardly or downwardly relative to horizontal.

In one construction, one of the body-mounted devices 26 is a radar (radio-based) or lidar (light-based) sensor for the vehicle 10 (a first automobile) that is part of a safety system configured to detect an object, such as a second automobile, in front of the vehicle 10 and take corresponding action. These systems are known as Adaptive Cruise Control (ACC) or Forward Collision Warning (FCW) systems. The sensor 26 emits one or more signals that are reflected off of an object (such as the second automobile). The reflected signals are then received by the sensor 26 and aspects of the reflected signals are interpreted by the sensor 26 to monitor a distance to the second automobile and also a change in that distance relative to time (relative velocity), and furthermore a rate of change in the relative velocity (relative acceleration). The sensor 26 may be coupled to a controller such as a microprocessor that uses algorithms to determine if an unsafe condition is occurring, such as the second automobile coming to a panic stop in front of the vehicle 10. The controller can then take a responsive action such as alerting the driver of the vehicle 10 or activating the brakes of the vehicle 10, for example. The orientation of the radar or lidar sensor 26 relative to the body 14 is configured to be dynamically responsive to changes in the drive axis $A_D$ to maintain its alignment therewith during travel of the vehicle 10 along a non-neutral drive axis. This may be accomplished by monitoring and responding to changes in a steering angle that determines the drive axis $A_D$. Precise alignment of the sensor 26 with the drive axis $A_D$ at all times is important for maintaining proper function of the safety system over its range of operating conditions.

An angular offset between the body axis $A_B$ and the drive axis $A_D$ (e.g., 3 degrees) that is relatively common in production automobiles and seemingly insignificant, may easily impair the operation of a safety system as described above. Therefore, while the angular position of the body 14 relative to the drive axis $A_D$ does not necessarily need to be corrected, a system and method are provided by the invention to establish alignment between the body-mounted devices 26 and the drive axis $A_D$. Thus, the body-mounted devices 26 can be reliably aligned with the drive axis $A_D$ regardless of the offset angle between the body axis $A_B$ and the drive axis $A_D$.

Figure 1:
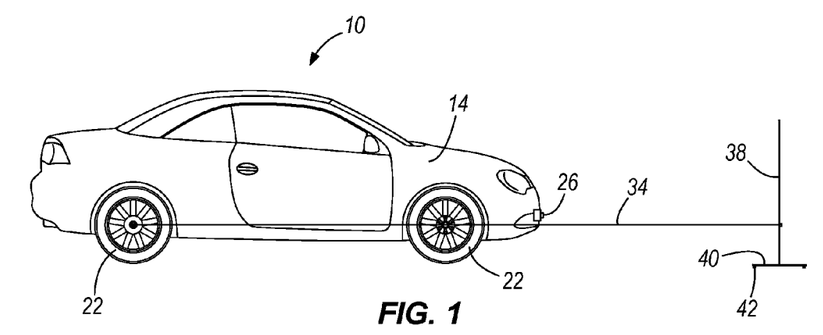
FIG. 1 is a side view of a portion of an alignment system for a vehicle-mounted device according to one construction of the invention.
Figure 2:
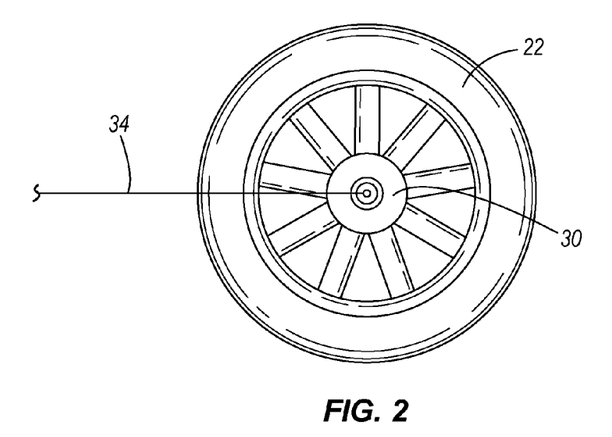
FIG. 2 is a side view of a rear wheel of a vehicle having a string of the alignment system of FIG. 1 coupled thereto via an attachment for alignment of a screen of the alignment system.

The general setup of the inventive system will now be described with respect to FIGS. 1 and 2. In one embodiment, there are attachments 30 to both of the rear wheels 22, such that a pair of elongated members such as strings 34 originate from points on the axis RA of the rear axle 24, which is perpendicular to the vehicle drive axis $A_D$. The strings 34 may be segments of high-strength low-stretch kite string, rope, cord, steel or other metal cable, or the elongated members may be provided as rigid rods or bars with suitable end couplings. Although the description of the illustrated constructions will primarily be described with reference to the strings 34, suitable alternatives such as those set forth above are considered throughout. The strings 34 are of equal length, and are attached to an alignment target structure such as a screen 38, as will be described in more detail below, such that the screen 38 is parallel to the vehicle's rear axle 24, and the radar sensor 26 can be aligned to the screen 38. The screen 38 includes a base portion 40 and will stay in place once it has been positioned as described below. The base portion 40 may include rubber feet 42 or other tractive surfaces to keep the screen 38 in place.

The wheel attachments 30 can be positioned such that the string 34 starts from a point on the axis RA of the rear axle 24. This can be achieved by having a stopper of the string 34 behind a hole in the center of the attachment device 30. The attachment device 30 could, for example, be mounted by magnets that are fixed to the bolts/nuts that attach the wheel. Obviously, there are also other attachment methods, like using pins that go into defined holes on the wheels, or suction cups. A clear window can be left in the center of the attachment device 30, so that the user can attach it and verify that the string 34 starts from a point on the axis RA of the rear axle 24.

Figure 3:
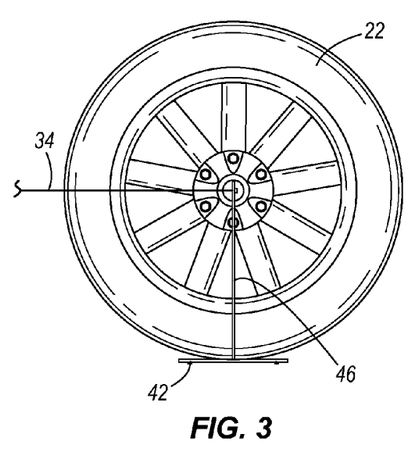
FIG. 3 is a side view of a stand used to locate a string relative to the rear wheel of a vehicle without attaching the string to the rear wheel.
Figure 4:
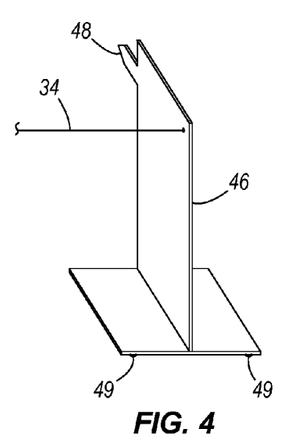
FIG. 4 is a perspective view of the stand of FIG. 3.

In another embodiment shown in FIGS. 3 and 4, a pointer stand 46 can be set next to the rear wheel 22, such that its pointer 48 points to the center of the wheel 22. The pointer stand 46 should be constructed so that it is easy to verify that it is pointing to the correct location. It has a connection where the string 34 to the screen 38 originates. The stand 46 has rubber feet 49, so that it does not slip on the ground when the screen 38 is moved and positioned into place. In other embodiments, the stand 46 could be heavy enough not to slip, or suction cups could hold it in place on the ground. A similar stand 46, in mirror image, is used for the other rear wheel 22. Optionally, a device like a laser pointer could be mounted on the stand 46 such that it shines at the screen 38, and it can be better estimated, that the user places the stand perpendicular to the rear wheel 22.

It should also be noted that, regardless of how the strings 34 are mounted, the strings 34 need not originate exactly on the axis RA of the rear axle 24. Rather, both strings 34 simply need to be positioned substantially equidistant from the axis RA, and if spaced a non-zero distance from the axis RA, be offset in the same direction. For example, the pointers 48 could be positioned to point to the nearest point or the farthest point on the rim relative to the screen 38. However, the distance between the sensor 26 and the screen 38 must be predetermined to accomplish certain aspects of at least one of the alignment methods described below. Thus, a consistent, repeatable convention for attaching the strings 34 should be established (and corresponding string length determined) so that the screen 38 can be positioned at the predetermined spacing distance in front of the sensor 26.

Figure 5:
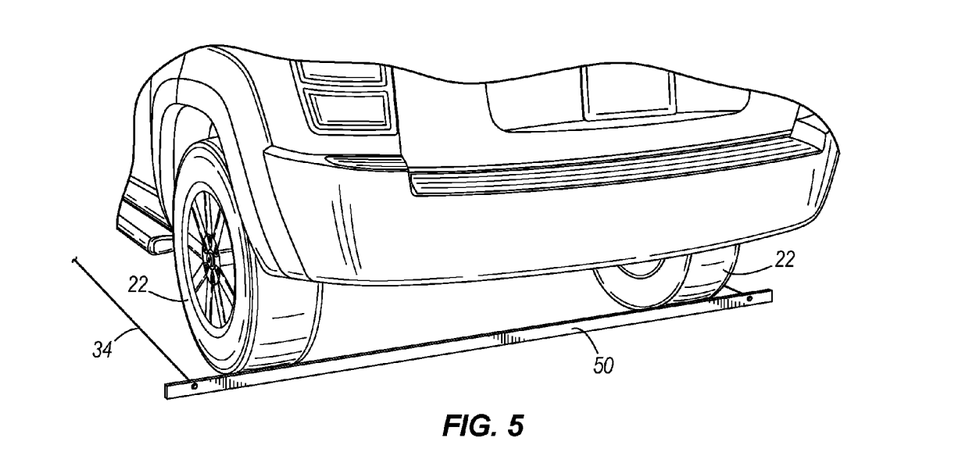
FIG. 5 is a perspective view of a bar engaged with both rear wheels of a vehicle for locating the ends of two strings relative to the rear wheels.

Yet another string mounting alternative is illustrated in FIG. 5. In this embodiment, a bar 50 is positioned under the back of the rear wheels 22 and wedged into position between the wheels 22 and the floor as shown in FIG. 5. In the illustrated construction, the bar 50 has a length that is greater than the width of the vehicle 10. The starting points of the strings 34 are at both ends of the bar 50. It is important that the rear wheels 22 are of the same type and have approximately the same air pressure so that the wheels 22 serve as an accurate representation of the orientation of the rear axle 24.

Regardless of which of the attachment methods is used, the strings 34 should be of equal length from the screen 38 to the attachment location adjacent the rear wheels 22. For the laser pointer method described below, the strings 34 should be a predetermined length. As described above, the strings 34 may be of a flexible material, such as kite-string or steel cable, among others, or elongated members may be provided of an inflexible material such as a metal rod or bar. The material of the strings 34 has a high modulus of elasticity, thus limiting or eliminating elastic deformation at low loads (e.g., when the strings 34 are pulled taut by hand).

The strings 34 may be coupled with a fine adjustment device at the connection with either the screen 38 or the wheels 22 (e.g., attachments 30, bar 50, etc.) so that the string lengths can be adjusted by small amounts. This may be necessary to ensure that the strings 34 are of the same length, thereby calibrating the equipment so that the screen 38 is parallel to the rear axle 24. Threaded members such as rods, bolts, eye bolts, turnbuckles, or other suitable attachment devices may be used to provide fine-controlled adjustability for the strings 34 or rigid elongated members. In some constructions, the strings 34 or rigid elongated members may be coupled with fasteners that attach to and are slidable within channels on the screen 38 or the attachment structure adjacent the rear wheels 22.

The strings 34 are attached to the screen 38 in such a way that the strings 34 on the left and right side are separated, both at the screen 38 and at their starting points adjacent the rear axle 24, by a substantially equal distance. This ensures that a parallelogram is automatically formed between the strings 34, the screen 38, and the rear axle 24 (or bar 50). When flexible strings 34 are used, the parallelogram is automatically formed when the strings 34 are pulled taut (e.g., by pulling the screen 38 out away from the vehicle 10). When rigid elongated members are used instead of flexible elongated members, the rigid elongated members may or may not be required to be pulled taut, depending on whether or not the end connections are capable of generating slack.

Figure 6:
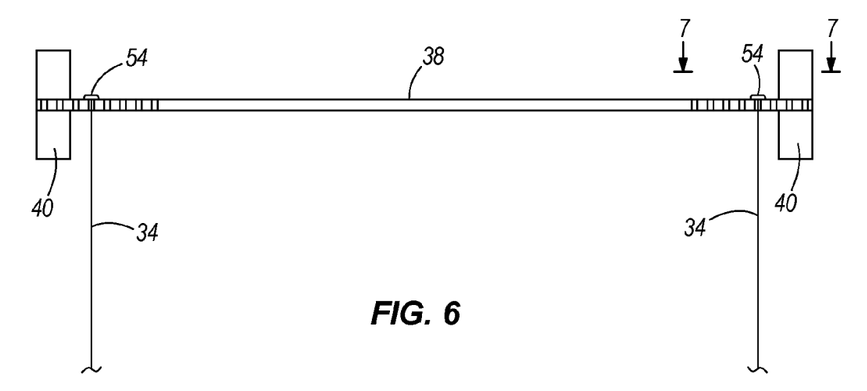
FIG. 6 is a top view of a screen of the alignment system of FIG. 1.
Figure 7:
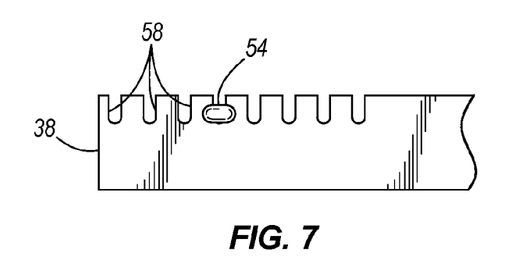
FIG. 7 is a front detail view of a string attachment portion of the screen of FIG. 6.

Since different vehicles 10 have different axle lengths, there are different attachment possibilities for different vehicles. If the axle lengths are not known previously, the vehicle rear axle length is measured for this alignment procedure. As shown in FIGS. 6 and 7, there are several positions on the screen 38 where the string stoppers or ends 54 can be attached. The strings 34 should be easily movable, so that the system can quickly be reconfigured for different vehicles. As shown in FIGS. 6 and 7, the screen 38 can include notches 58 into which the stoppers 54 can be inserted and removed. The notches 58 or other suitable string attachment structures can be located adjacent the sides of the screen 38 at any desired height as long as the heights of the left and right side attachment structures on the screen 38 are the same. It may be desirable to locate the notches 58 or other string attachment structures adjacent the bottom of the screen 38 (e.g., on or adjacent the base portion 40). As opposed to notches 58, the string attachment structure may include channels in which the stoppers 54 are slidable.

Figure 8:
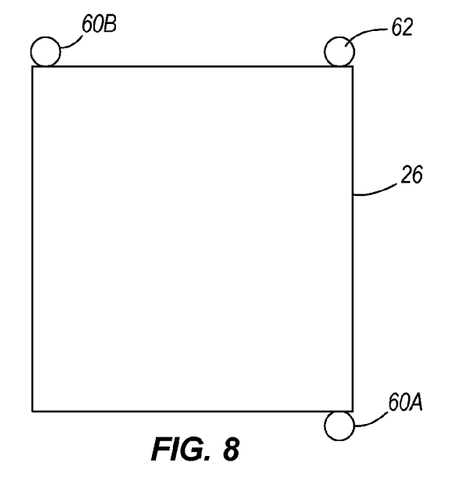
FIG. 8 is a schematic view of an adjustable vehicle-mounted device or sensor.

One vehicle-mounted-device or sensor 26 is schematically illustrated in FIG. 8 and has two adjustment screws 60A, 60B. A first adjustment screw 60A is operable to adjust the sensor 26 in the vertical direction and a second adjustment screw 60B is operable to adjust the sensor 26 in the horizontal direction. These adjustment screws 60A, 60B will be used during the following alignment procedures to ultimately align the sensor 26 to the vehicle drive axis $A_D$, both horizontally and vertically. Reference number 62 indicates a fixed point on the sensor 26.

The first of two alignment systems and methods will now be described with reference to FIGS. 9-11. In this first method, a laser pointer 64 (see FIG. 11) is used in the alignment process. The laser pointer 64 is fixedly mounted to the sensor device 26 (either specifically for the alignment procedure or as part of the sensor manufacturing process). As described above, the laser pointer 64 can be aligned with the output axis of the sensor 26 or can be offset by a known or measurable amount from the axis of the sensor 26.

For the first method, it is important that the screen 38 is positioned at right angles, or perpendicular, to the connecting strings 34. The right angles can be found using an alignment aid such as a plate 68 (see FIG. 10) attached to the screen 38. The plate 68 includes lines that are perpendicular to the screen 38. Since there are different attachment positions for the string 34 on the screen 38 (such that the screen 38 can be used for different vehicles 10), a set of parallel lines is practical, and it is therefore easy to see when the string 34 is parallel to these lines and therefore perpendicular to the screen 38. The screen 38 is moved into position so that the strings 34 are parallel to the lines on the plate 68. Of course, other methods can be used to determine when the strings 34 are perpendicular to the screen 38.

Figure 9:
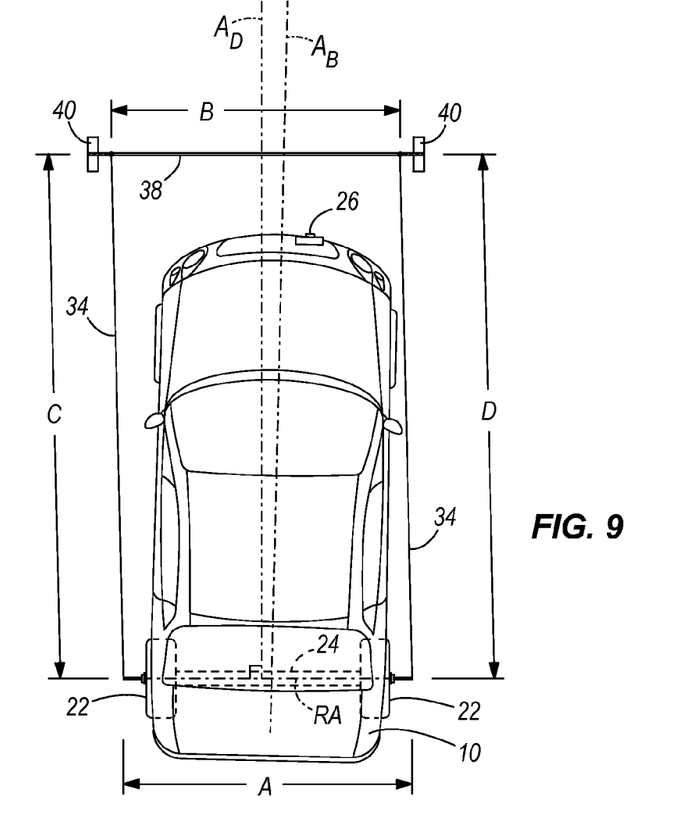
FIG. 9 is a top view of the alignment system of FIG. 1 being used to obtain horizontal alignment between a vehicle-mounted device or sensor and the screen.
Figure 10:
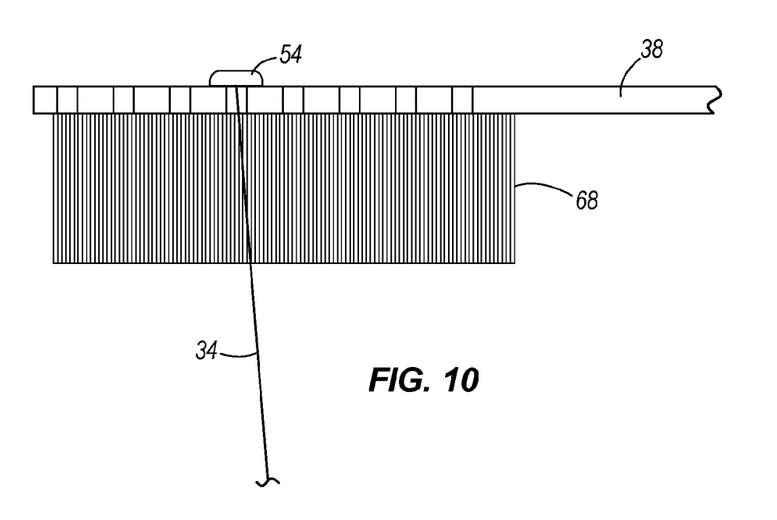
FIG. 10 is a top detail view of an alignment aid at the string attachment portion of the screen.

With reference to FIG. 9, the two distances A and B should be substantially equal. As such, vehicle axle length (plus any attachments or extensions) may be discovered by either measuring these, or looking up the axle length in a vehicle data book containing this information. The resulting dimension is the distance A. The strings 34 are thus connected to the screen with the distance B therebetween, so that the distance B is substantially equal to the distance A. The string lengths C and D are also of known, substantially equal values. The lengths C and D can be fixed by the equipment itself, or can be adjustable via stopper settings, etc. so that it can be calibrated to the desired equal lengths C and D. Once the strings 34 are aligned with the parallel lines on the plate 68, a rectangular relationship will exist between the screen 38, the strings 34, and the rear axle 24.

To facilitate horizontal alignment of the sensor 26, a predetermined marking (e.g., dot, line segment, cross-hair, etc.) is placed on the screen 38. Since the sensor 26 may be mounted at different locations on different vehicles, multiple sets of markings can be present on the screen 38 and are positioned at the proper locations for the various different vehicles with which the screen 38 can be used. The sensor 26 can then be adjusted in the horizontal direction (with the second adjustment screw 60B) to align with the drive axis $A_D$ of the vehicle by aligning the laser pointer 64 (and therefore the sensor 26 itself) with the predetermined marking.

For vertical alignment, predetermined markings could also be used in the same manner as described above for the horizontal alignment. However, vertical alignment can also be performed without markings on the screen by using an adjustable height stand 72 as shown in FIG. 11. This stand 72 consists of a frame 73 and a plane 74 with a slit 76 extending in the horizontal direction. This plane 74, and thereby the slit 76, can be moved vertically and fixed with a knob or other suitable adjustment mechanism (not shown) to position the slit 76 at a desired vertical height relative to the ground.

The slit 76 is set to the height of the laser pointer 64 output beam when the stand 72 is positioned near the laser pointer 64. Then, without adjusting the height of the slit 76, the stand 72 is moved to a location adjacent the screen 38. If the beam of the laser pointer 64 still shines through the slit 76 and onto the screen 38, no vertical adjustment of the sensor 26 is needed. However, if the beam does not pass through the slit 76, the vertical adjustment screw 60A can be adjusted to properly adjust the vertical direction alignment of the sensor 26. The beam should still hit the appropriate horizontal alignment markings on the screen 38 as well. This system confirms that the laser pointer 64, and thus the sensor 26, is pointing parallel to the ground. The ground should be level and free of any defects or variations in height for best results using this method.

It is important to remember that the above process aligns the laser pointer 64. Care should be taken to confirm that any offset between the laser pointer 64 and the output axis of the device 26 be accounted for. In order to compensate for any difference between the laser pointer 64 axis and the sensor 26 axis, the operator must confirm the offset(s), which are commonly measured during production of the sensor 26. This may be done by noting the offset from an indication on the sensor 26 itself or in reference materials for the sensor available from the manufacturer, or by measuring the mounting positions of the laser pointer 64 on the sensor 26 (e.g., with a laser). Offset values can be stored (e.g., via electronic memory) in the sensor 26.

After having aligned the laser pointer 64 as described above, correction strips 78 (FIG. 11) can be placed on the screen 38, and then the sensor 26 can be adjusted away from the predetermined marking(s) by a specific amount to account for any offsets between the sensor 26 and the laser pointer 64. To obtain accuracy when correcting for offsets, the length of the strings 34 and the orientation between the string ends and the rear axle 24 must conform to predetermined values for a particular vehicle since the accuracy of the correction strips 78 depends on the distance between the sensor 26 and the screen 38. The use of offset correction strips 78 can be used for both vertical and horizontal offsets.

Figure 11:
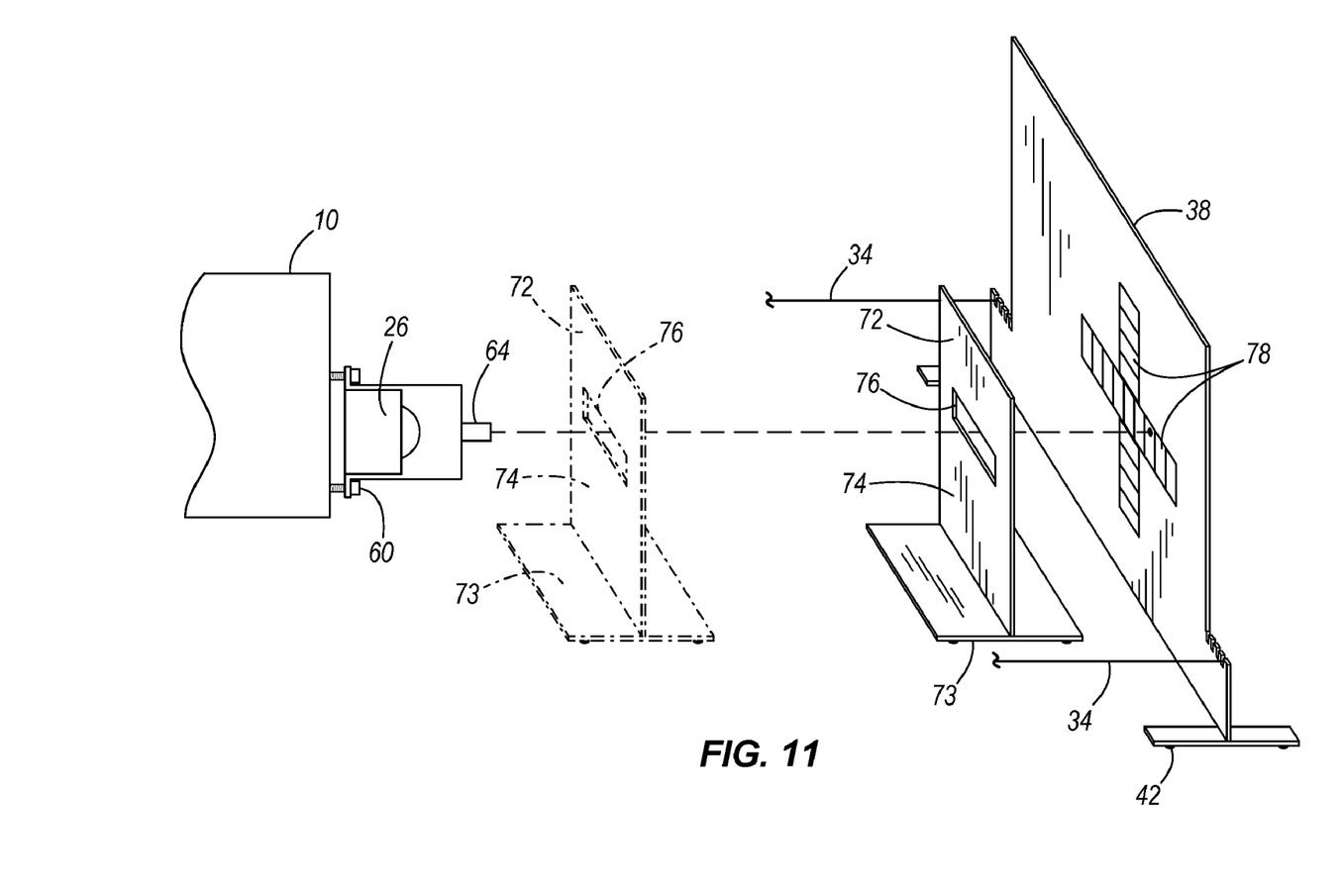
FIG. 11 is a perspective view of a laser-enabled vehicle-mounted device being vertically aligned with a movable slitted stand of the alignment system.

FIG. 11 illustrates how the offset between the laser pointer 64 and the sensor device 26 can be compensated for. The laser pointer 64 has already been aligned perpendicular to the rear axle 24 (and therefore aligned with the drive axis $A_D$) and parallel to the ground. The sensor 26 has an offset to the laser pointer axis, and this has previously been recorded in the sensor 26 or is otherwise known or determined. The offset can be accounted for by adjusting the sensor 26 and the laser pointer 64 so that the beam from the laser pointer 64 is moved away from the predetermined marking by a predetermined amount to account for the known offset to the axis of the sensor 26.

The second device alignment system and method will now be described with reference to FIGS. 12-15. In this second method, referred to herein as the active alignment method, the alignment target 138 does not need to be put at right angles to the strings 34. Rather, it is sufficient that a parallelogram exists between the target 138, the strings 34, and the rear axle 24. The strings 34 and string attachment structures for the target 138 and the vehicle 10 are not shown in FIGS. 12-15 for simplicity, but are provided and used as described above (with the exception that right angles need not be obtained).

The following description is applicable to sensors 26 such as the most common types of automotive radar, and potentially others. The sensor 26 has multiple antennas in a line in the horizontal direction, but may not have multiple antennas in the vertical direction. Alignment of the sensor 26 in the horizontal direction is found by determining the point where the power of an emitted signal reflected from a perpendicular reflection surface and received by the two middle antennas is equal (for an odd number of antennas, the two antennas next to the middle antennas). The angle of the sensor 26 is changed with the horizontal adjustment screw 60B until this point is reached.

To facilitate the type of active alignment method described above, the target 138 includes a mirror 80 and a base portion 82 on which the mirror 80 is supported as shown in FIGS. 12-15. The mirror 80 can be a conventional mirror (e.g., silvered glass), or any other structure, such as a metal sheet, that reflects radar waves evenly. The target 138 is illustrated in a generally schematic manner in FIG. 12. Greater detail according to one exemplary construction is provided in FIGS. 13-15.

Figure 12:
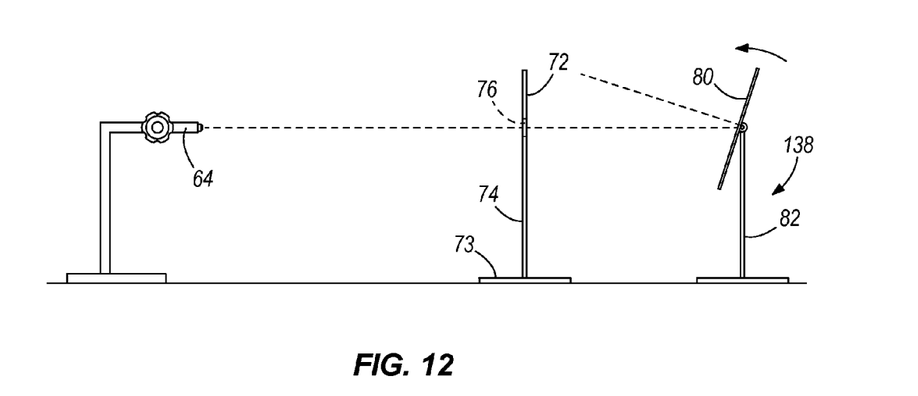
FIG. 12 is a side view of a vertical alignment device including a screen with a rotatably-mounted mirror.
Figure 13:
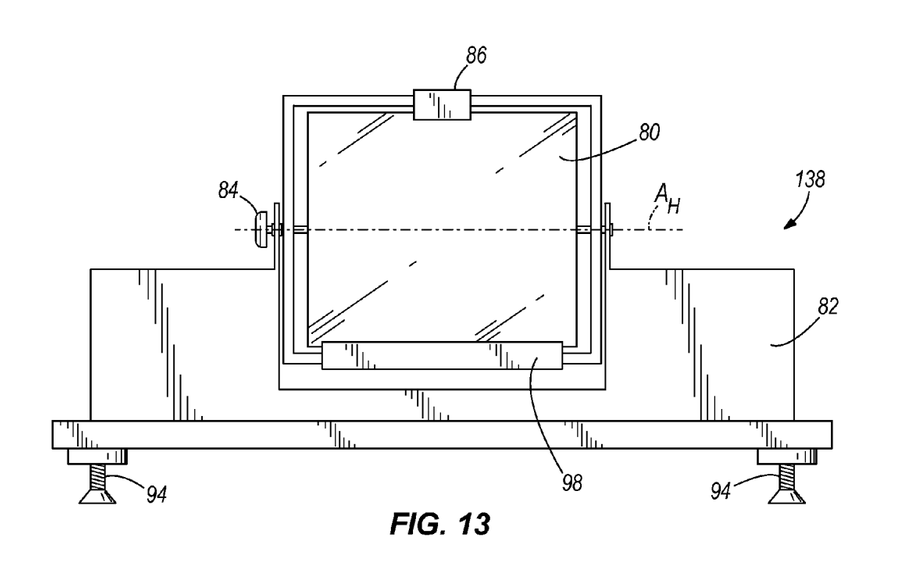
FIG. 13 is a front view of the screen of FIG. 12.
Figure 14:
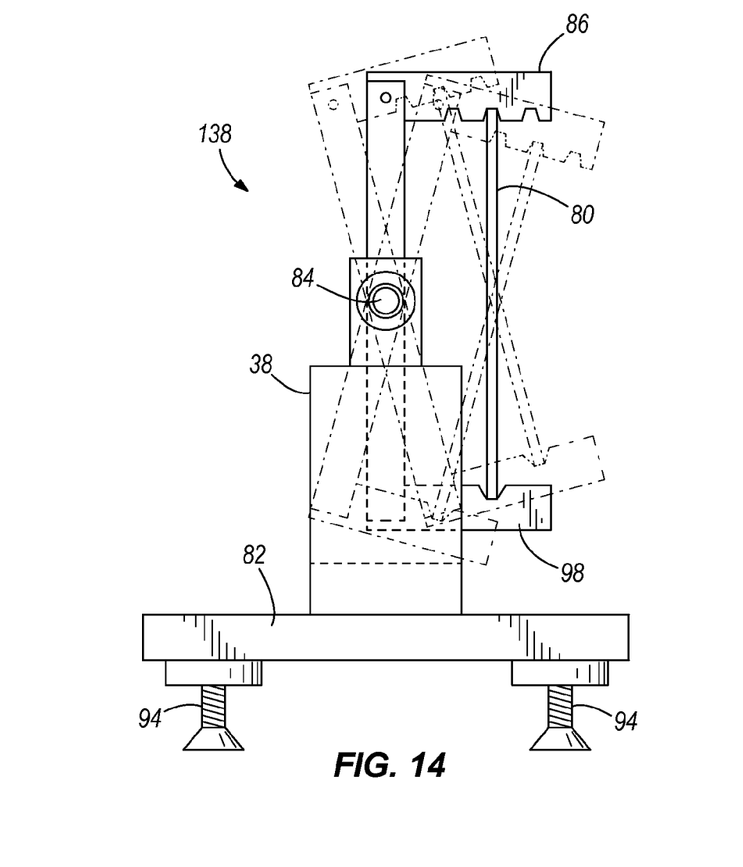
FIG. 14 is a side view of the screen of FIG. 12 illustrating the mirror and a mirror frame rotatably-mounted on the screen.

To ensure the vertical orientation of the mirror 80, the stand 72 is used (although it need not be height-adjustable as described above). A laser pointer 64 is mounted at the same height as the slit 76 of the stand 72 so that it directs a beam of light toward the target 138 through the slit 76 (FIG. 12). Note that it is not necessary in this method to attach the laser pointer 64 to the sensor 26. Rather, the laser pointer 64 can be mounted at another location on the vehicle 10. The stand 72 is then placed closer to the target 138, and the laser pointer 64 is adjusted so that it points through the slit 76 to the target 138 (the laser pointer will not need to be adjusted if already outputting a horizontal beam, but in practice adjustment might be necessary). In the next step, the mirror 80 is rotated relative to the base 82 about a horizontal axis $A_H$, as shown in FIG. 14, until the beam from the laser pointer 64 reflects back to its source. This finds the position where the mirror 80 is perpendicular to the ground, and the orientation of the mirror 80 can be fixed by a knob 84. As alternatives to utilizing the laser pointer 64 and the stand 72 as described above, the laser pointer 64 can be provided with an on-board liquid level to ensure that the laser pointer 64 will emit a horizontal beam, or a liquid level may be provided directly on the mirror 80. Furthermore, as an alternative to adjusting the mirror 80 relative to the base 82, the angle of the entire target 138 (including the mirror 80) may be adjusted relative to the ground by manipulating one or more height-adjustable feet 94 or other adjustable structure(s) of the base 82 that support the target 138 in order to get the mirror 80 perpendicular to the ground.

Figure 15:
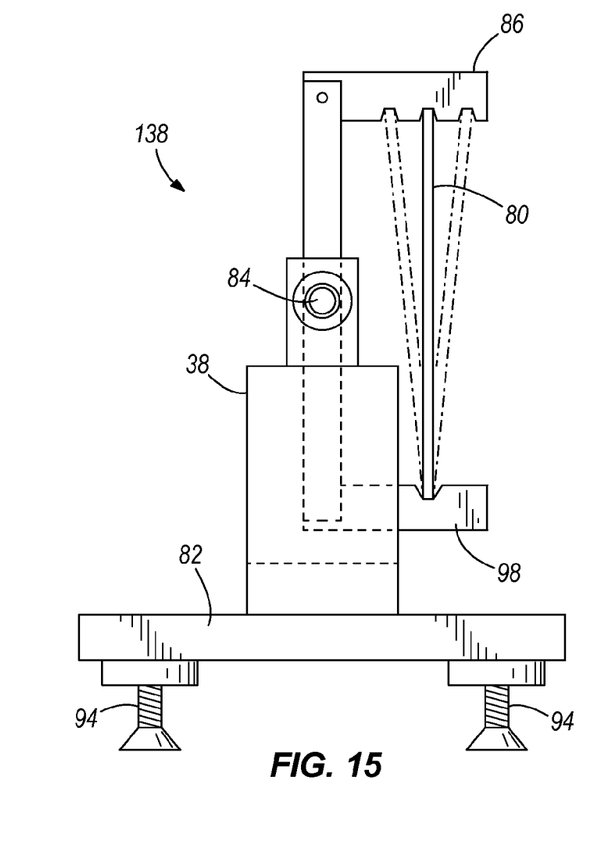
FIG. 15 is a side view of the screen of FIG. 12 illustrating the mirror rotatably-mounted on the mirror frame.

Referring now to FIG. 15, vertical alignment of the sensor 26 is described. The mirror 80 has been positioned as described above so that it is vertical (i.e., perpendicular to the ground). If the sensor 26 does not have multiple antennas in the vertical direction, the mirror 80 is moved from its vertical orientation (i.e., a "center" position) to both forward and backward tilted positions (of the same angle from the center position) as shown in FIG. 15. In the illustrated embodiment, an upper support arm 86 having three notched latch positions is used to position the top edge of the mirror 80. The upper support arm 86 may be pivotably coupled to the target 138. The bottom edge of the mirror 80 is supported by a notched support block 98. The alignment as described above (to make the mirror 80 perpendicular to the ground) is done with the mirror 80 in the middle latch position of the arm 86. The mirror 80 is then sequentially moved to the other two latch positions. In each of the three positions (center, upwardly-tilted, and downwardly-tilted), the sensor 26 is operated to output a signal and the reflected power received back by the sensor 26 is recorded for each mirror position. Using the three data points, a parabola is generated by software associated with the sensor 26. If the sensor 26 is properly aligned, the data point for the center mirror position will coincide with the parabola's vertex and the two other data points will be equivalent. However, if the data point for the center mirror position is not the same as the value corresponding to the parabola's calculated vertex and the other two data points are unequal, then the sensor 26 must be adjusted via the vertical adjustment screw 60A. During this process, data may be recorded directly by memory within the sensor 26 or by an external means.

For a sensor 26 with multiple antennas in the vertical direction, the mirror 80 does not need to be moved to the upwardly-tilted and downwardly-tilted latch positions to complete a vertical alignment. Rather, a process similar to the active horizontal alignment described above can be carried out to determine proper vertical alignment of the sensor 26 (e.g., parallel to the ground).

Regardless of the method used (laser pointer method or active alignment method), the parallelogram/rectangular relationship setup is an important starting point. This relationship can be achieved relatively easily and in a cost-effective manner, thereby enabling either the laser pointer method or the active alignment method to be used to align the vehicle-mounted-device 26.

The invention provides, among other things, a system and method for aligning body-mounted devices with a vehicle's drive axis. The inventive systems and methods are compact and relatively portable such that they may be easily used and carried out in a cost-effective manner at virtually any location since no attachments need to be made to the floor or other infrastructure.

What is claimed is:

1. A system for aligning a device on a body of a vehicle relative to a drive axis of the vehicle defined by a pair of rear wheels, the system comprising:
    a bar configured to be wedged against the pair of rear wheels to assume an orientation perpendicular to the vehicle drive axis;
    a target configured to be positioned in the line of sight of the device to be oriented; and
    two substantially equal length elongated members coupled between the bar and the target such that a parallelogram is created by the bar, the target, and the two elongated members, regardless of the position of the target relative to the vehicle and the bar.

2. The system of claim 1, wherein the target includes a base to which the elongated members are coupled and a mirror rotatable about a horizontal axis relative to the base.

3. The system of claim 2, further comprising a laser pointer that directs a horizontal beam of light toward the mirror, the mirror being adjustable about the horizontal axis so that the horizontal beam of light can be reflected back to its source to determine a vertical orientation of the mirror.

4. The system of claim 2, wherein the target includes a latch operable to hold the mirror in at least three different orientations about the horizontal axis.

5. The system of claim 1, wherein the target includes a screen.

6. The system of claim 5, further comprising an alignment aid for visually confirming that the elongated members are substantially perpendicular to both the target and the bar.

7. The system of claim 6, wherein the alignment aid includes a plate coupled to the target adjacent at least one attachment location for the elongated members, the plate having a plurality of parallel lines thereon, all of which are substantially perpendicular to the screen.

8. The system of claim 1, wherein the elongated members are flexible members pulled taut between the bar and the target to create the parallelogram.

9. A method of orienting an alignment target relative to a vehicle for orienting a device on a body of a vehicle relative to a drive axis of the vehicle, the method comprising:
    coupling a first end of a first elongated member of a predetermined length to a left side of the alignment target;
    coupling a first end of a second elongated member of the predetermined length to a right side of the alignment target;
    fixing the position of a second end of the first elongated member at a fixed distance from the axis of a rear axle of the vehicle; and
    fixing the position of a second end of the second elongated member at the fixed distance from the axis of the rear axle so that the second ends of the first and second elongated members are spaced apart a spacing distance that is measured parallel to the axis of the rear axle, the spacing distance being substantially equal to a distance between the first ends of the first and second elongated members, such that the alignment target is automatically oriented to be parallel to the axis of the rear axle and perpendicular to the vehicle drive axis.

10. The method of claim 9, wherein the alignment target includes a mirror, the method further comprising positioning the mirror in a vertical orientation.

11. The method of claim 10, wherein positioning the mirror in a vertical orientation includes rotating the mirror about a horizontal axis until a horizontal beam of light directed toward the mirror is reflected back to its source.

12. The method of claim 10, wherein the device on the vehicle body is a sensor, the method further comprising determining an amount of angular misalignment of the sensor relative to the drive axis by operating the sensor to emit multiple signals and measuring signals reflected off of the mirror with multiple antennas of the sensor.

13. The method of claim 10, wherein positioning the mirror in a vertical orientation includes adjusting the height of one or more height-adjustable feet of the alignment target.

14. The method of claim 9, wherein the alignment target includes a screen, the method further comprising orienting the first and second elongated members to be substantially perpendicular to the screen and the axis of the rear axle.

15. The method of claim 14, further comprising providing an alignment aid coupled to the alignment target adjacent at least one attachment location for the elongated members, and visually confirming the alignment of at least one of the elongated members with at least one of a plurality of parallel lines on the alignment aid, all of which are substantially perpendicular to the screen.

16. The method of claim 9, wherein fixing the position of the second ends of the first and second elongated members at a fixed distance from the axis of the rear axle includes fixing the second ends of the first and second elongated members to a bar and wedging the bar against a pair of wheels of the vehicle's rear axle so that the bar assumes an orientation parallel to the axis of the rear axle and perpendicular to the vehicle drive axis.

17. The method of claim 9, wherein fixing the position of the second ends of the first and second elongated members at a fixed distance from the axis of the rear axle includes fixing the second ends of the first and second elongated members to respective wheel attachments that are coupled to respective wheels of the vehicle's rear axle.

18. The method of claim 9, wherein fixing the position of the second ends of the first and second elongated members at a fixed distance from the axis of the rear axle includes fixing the second ends of the first and second elongated members to respective stands that are positioned adjacent corresponding portions of each of a pair of wheels of the vehicle's rear axle.

19. The method of claim 9, wherein the fixed distance from the axis of the rear axle is a non-zero distance.

20. The method of claim 9, wherein the elongated members are flexible members, the method further comprising pulling the flexible members taut.

21. A method of orienting a sensor on a body of a vehicle relative to a vehicle drive axis with a reflective alignment target, the method comprising:
coupling respective first ends of two substantially equal length elongated members to the alignment target such that the first ends of the elongated members are spaced apart a spacing distance;
fixing respective second ends of the elongated members at a fixed distance from the axis of a rear axle of the vehicle, the second ends of the elongated members being spaced apart a spacing distance substantially equal to the spacing distance between the first ends of the elongated members, such that the alignment target is automatically oriented to be parallel to the axis of the rear axle and perpendicular to the vehicle drive axis;
positioning a mirror of the alignment target in a vertical orientation; and
determining an amount of angular misalignment of the sensor relative to the drive axis by operating the sensor to emit multiple signals and then measuring signals reflected off of the mirror with multiple antennas of the sensor.

22. The method of claim 21, wherein fixing the respective second ends of the elongated members at a fixed distance from the axis of the rear axle includes fixing the respective second ends of the elongated members to a bar and wedging the bar against a pair of wheels of the vehicle's rear axle so that the bar assumes a position parallel to the axis of the rear axle and perpendicular to the vehicle drive axis.

23. The method of claim 21, wherein the elongated members are flexible members, the method further comprising pulling the flexible members taut.

* * * * *